US011884893B1

(12) United States Patent
Knouse et al.

(10) Patent No.: US 11,884,893 B1
(45) Date of Patent: Jan. 30, 2024

(54) ANTIWEAR SYSTEM FOR IMPROVED COPPER CORROSION

(71) Applicant: Afton Chemical Corporation, Richmond, VA (US)

(72) Inventors: Brandon Knouse, Moseley, VA (US); David Edwards, Richmond, VA (US); Magdalena Makowska, Mechanicsville, VA (US); Gregory James, Glen Allen, VA (US); Robert Mccovick, Chesterfield, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 18/193,744

(22) Filed: Mar. 31, 2023

(51) Int. Cl.
| | |
|---|---|
| *C10M 137/10* | (2006.01) |
| *C10M 169/04* | (2006.01) |
| *C07F 9/17* | (2006.01) |
| C10N 40/08 | (2006.01) |
| C10N 30/06 | (2006.01) |

(52) U.S. Cl.
CPC ........... *C10M 137/105* (2013.01); *C07F 9/17* (2013.01); *C10M 169/04* (2013.01); C10M 2203/003 (2013.01); C10M 2223/047 (2013.01); C10N 2030/06 (2013.01); C10N 2040/08 (2013.01)

(58) Field of Classification Search
CPC ............ C10M 137/105; C10M 169/04; C10M 2203/003; C10M 2223/047; C10N 2030/06; C10N 2040/08
See application file for complete search history.

(56) References Cited

U.S. PATENT DOCUMENTS

| | | | |
|---|---|---|---|
| 2,237,625 A | 4/1941 | Olin | |
| 2,237,627 A | 4/1941 | Olin | |
| 2,527,948 A | 10/1950 | Lyon, Jr. et al. | |
| 2,695,316 A | 11/1954 | Mcbride | |
| 2,783,204 A * | 2/1957 | Mcdermott | ........ C10M 137/105 44/379 |
| 2,995,569 A | 8/1961 | Hamilton et al. | |
| 3,022,351 A | 2/1962 | Mihm et al. | |
| 3,219,666 A | 11/1965 | Norman et al. | |
| 3,308,166 A | 3/1967 | Biensan et al. | |
| 3,392,201 A | 7/1968 | Warner | |
| 3,471,404 A | 10/1969 | Myers | |
| 3,565,804 A | 2/1971 | Honnen et al. | |

(Continued)

FOREIGN PATENT DOCUMENTS

| | | |
|---|---|---|
| EP | 612839 A1 | 8/1994 |
| GB | 1162334 A | 8/1969 |

OTHER PUBLICATIONS

W. W. Yau, J. J. Kirkland and D. D. Bly, "Modern Size Exclusion Liquid Chromatography", John Wiley and Sons, New York, 1979.

(Continued)

*Primary Examiner* — Vishal V Vasisth
(74) *Attorney, Agent, or Firm* — Honigman LLP

(57) ABSTRACT

An oil-soluble ashless antiwear additive and a lubricating composition including the ashless antiwear additive having improved copper corrosion performance obtained by reacting an organic hydroxy compound with phosphorus pentasulfide to form a reaction product, distilling the reaction product and recovering a condensate, and reacting the condensate with an unsaturated carboxylic acid to form an oil-soluble phosphorus antiwear additive.

28 Claims, 2 Drawing Sheets

(56) References Cited

U.S. PATENT DOCUMENTS

| | | | |
|---|---|---|---|
| 3,634,515 A | 1/1972 | Piasek et al. | |
| 3,673,090 A | 6/1972 | Waldbillig et al. | |
| 3,697,574 A | 10/1972 | Piasek et al. | |
| 3,703,504 A | 11/1972 | Horodysky | |
| 3,703,505 A | 11/1972 | Horodysky et al. | |
| 3,736,357 A | 5/1973 | Piasek et al. | |
| 3,796,661 A | 3/1974 | Suratwala | |
| 3,873,454 A | 3/1975 | Horodysky et al. | |
| 4,119,549 A | 10/1978 | Davis | |
| 4,119,550 A | 10/1978 | Davis et al. | |
| 4,147,640 A | 4/1979 | Jayne et al. | |
| 4,191,659 A | 3/1980 | Davis | |
| 4,191,826 A * | 3/1980 | Hermans | C08K 5/5399 544/337 |
| 4,204,969 A | 5/1980 | Papay et al. | |
| 4,218,332 A | 8/1980 | Schwab | |
| 4,234,435 A | 11/1980 | Meinhardt et al. | |
| 4,240,958 A | 12/1980 | Braid | |
| 4,344,854 A | 8/1982 | Davis et al. | |
| 4,472,306 A | 9/1984 | Powers et al. | |
| 4,564,709 A | 1/1986 | Koyama et al. | |
| 4,636,322 A | 1/1987 | Nalesnik | |
| 4,711,736 A | 12/1987 | Horodysky et al. | |
| 4,795,576 A | 1/1989 | Born et al. | |
| 4,954,274 A | 9/1990 | Zaweski et al. | |
| 4,966,720 A | 10/1990 | DeGonia et al. | |
| 5,266,223 A | 11/1993 | Song et al. | |
| 5,627,259 A | 5/1997 | Thaler et al. | |
| 5,633,326 A | 5/1997 | Patil et al. | |
| 5,643,859 A | 7/1997 | Gutierrez et al. | |
| 5,792,729 A | 8/1998 | Harrison et al. | |
| 5,851,965 A | 12/1998 | Harrison et al. | |
| 5,853,434 A | 12/1998 | Harrison et al. | |
| 5,936,041 A | 8/1999 | Diana et al. | |
| 9,481,696 B1 | 11/2016 | Edwards et al. | |
| 11,214,750 B2 | 1/2022 | Milner | |
| 2012/0101017 A1 | 4/2012 | Duggal | |
| 2016/0102266 A1 * | 4/2016 | Edwards | C10M 143/00 508/423 |
| 2016/0281020 A1 | 9/2016 | Yamamoto et al. | |
| 2018/0002631 A1 | 1/2018 | Milner | |

OTHER PUBLICATIONS

U.S. Appl. No. 18/193,789, filed Mar. 31, 2023.
U.S. Appl. No. 18/193,843, filed Mar. 31, 2023.
U.S. Appl. No. 18/193,875, filed Mar. 31, 2023.

* cited by examiner

ANTIWEAR SYSTEM FOR IMPROVED COPPER CORROSION

TECHNICAL FIELD

The present disclosure relates to oil-soluble phosphorus antiwear additives and to lubricating composition including the oil-soluble phosphorus antiwear additives with improved copper corrosion.

BACKGROUND

Lubricating compositions are designed to strike a balance between low wear and low friction and, at the same time, minimize other performance shortcomings. For instance, zinc dialkyl dithiophosphates, commonly known as ZDDP, are a widely used antiwear additive in lubricants such as engine oils, transmission fluids, and/or hydraulic oils. However, the zinc provided by such additives can be less desired in some applications leading to an increased use of so-called ashless or metal-free antiwear additives. Ashless (i.e., metal-free) dithiophosphates are one such alternative, but while ashless dithiophosphates have good antiwear and extreme pressure performance, these additives may have a tendency to corrode metal and, in particular, copper and bronze metals.

SUMMARY

In one approach or embodiment, the present disclosure describes a lubricating composition comprising a majority of one or more base oils of lubricating viscosity; and an oil-soluble phosphorus antiwear additive made by a process comprising the steps of (a) reacting an organic hydroxy compound with phosphorus pentasulfide to form a reaction product; (b) distilling the reaction product and recovering a condensate; and (c) reacting the condensate with an unsaturated carboxylic acid to form the oil-soluble phosphorus antiwear additive.

In another approach or embodiment, the lubricating composition described in the previous paragraph may include optional features and/or embodiments in any combination. These optional features or embodiments may include one or more of the following: wherein the distillation occurs at one or more of a temperature of at least about 50° C., a pressure of at least about 0.1 torr, or combinations thereof; and/or wherein the condensate is recovered at a temperature of about 10° C. or less; and/or wherein the distillation occurs in a falling-film evaporator, a wiped-film evaporator, a thin-film evaporator, a short-path evaporator, or combinations thereof, and/or wherein the condensate includes a dialkyl dithiophosphoric acid; and/or wherein the dialkyl dithiophosphoric acid is dipropyl dithiophosphoric acid, diisopropyl dithiophosphoric acid, dibutyl dithiophosphoric acid, diisobutyl dithiophosphoric acid, or combinations thereof; and/or wherein the unsaturated carboxylic acid is an C1 to C20 fatty acid; and/or wherein the unsaturated fatty acid is acrylic acid, methacrylic acid, 2-ethyl acrylic acid, or combinations thereof, and/or wherein the organic hydroxy compound is a C1 to C6 linear or branched alcohol, a hydroxyl aryl compound, or mixtures thereof, and/or wherein the organic hydroxy compound is methyl alcohol, ethyl alcohol, propyl alcohol, isopropyl alcohol, butyl alcohol, isobutyl alcohol, tert-butyl alcohol, sec-butyl alcohol, phenol, naphthol, an amyl alcohol, hexyl alcohol, iso-hexyl alcohol, octyl alcohol, decyl alcohol, dodecyl alcohol, octadecyl alcohol, 2-ethylhexyl alcohol, 4-methyl-2-pentyl alcohol, phenyl alcohol, butylphenyl alcohol, cyclohexyl alcohol, methylcyclopentyl alcohol, propenyl alcohol, butenyl alcohol, or combinations thereof, and/or wherein the organic hydroxy compound is isobutyl alcohol, the reaction product comprises diisobutyl dithiophosphoric acid and one or more phosphorus polysulfides, the condensate includes the diisobutyl dithiophosphoric acid and is substantially free of the one or more phosphorus polysulfides, and the condensate is further reacted with methacrylic acid to form the oil-soluble phosphorus antiwear additive; and/or wherein the lubricating composition includes about 0.1 to about 5 weight percent of the oil-soluble phosphorus antiwear additive; and/or wherein the organic hydroxy compound is provided in a molar ratio relative to the phosphorus pentasulfide of about 4:1 to about 10:1; and/or wherein the unsaturated carboxylic acid is provided in a molar ratio relative to the organic hydroxy compound of about 0.01:1 to about 0.5:1.

In yet another approach or embodiment, a method of preparing an oil-soluble phosphorus antiwear additive is provided by this disclosure where the method comprises reacting an organic hydroxy compound with phosphorus pentasulfide to form a reaction product; distilling the reaction product and recovering a condensate therefrom; and reacting the condensate with an unsaturated carboxylic acid to form the oil-soluble phosphorus antiwear additive.

In other approaches or embodiments, the method of the previous paragraph may include optional features, steps, or embodiments in any combination. These optional features, step, or embodiments may include one or more of the following: wherein the distillation occurs at a temperature of at least about 50° C.; and/or wherein the distillation occurs at a pressure of at least about 0.1 torr; and/or wherein the condensate is recovered at a temperature of about 10° C. or less; and/or wherein the distillation occurs in a falling-film evaporator, a wiped-film evaporator, a thin-film evaporator, a short-path evaporator, or combinations thereof, and/or wherein the condensate includes a dialkyl dithiophosphorus acid; and/or wherein the dialkyl dithiophosphoric acid is dipropyl dithiophosphoric acid, diisopropyl dithiophosphoric acid, dibutyl dithiophosphoric acid, diisobutyl dithiophosphoric acid, or combinations thereof, and/or wherein the unsaturated carboxylic acid is an C1 to C20 fatty acid; and/or wherein the fatty acid is acrylic acid, methacrylic acid, 2-ethyl acrylic acid, or combinations thereof, and/or wherein the organic hydroxy compound is a C1 to C6 linear or branched alcohol, a hydroxy aryl compound, or mixtures thereof, and/or wherein the organic hydroxy compound is methyl alcohol, ethyl alcohol, propyl alcohol, isopropyl alcohol, butyl alcohol, isobutyl alcohol, tert-butyl alcohol, sec-butyl alcohol, phenol, naphthol, an amyl alcohol, hexyl alcohol, iso-hexyl alcohol, octyl alcohol, decyl alcohol, dodecyl alcohol, octadecyl alcohol, 2-ethylhexyl alcohol, 4-methyl-2-pentyl alcohol, phenyl alcohol, butylphenyl alcohol, cyclohexyl alcohol, methylcyclopentyl alcohol, propenyl alcohol, butenyl alcohol, or combinations thereof, and/or wherein the organic hydroxy compound is isobutyl alcohol, the reaction product comprises diisobutyl dithiophosphoric acid and one or more phosphorus polysulfides, the condensate includes the diisobutyl dithiophosphoric acid and is substantially free of the one or more phosphorus polysulfides, and the condensate is further reacted with methacrylic acid to form the oil-soluble phosphorus antiwear additive; and/or wherein the organic hydroxy compound is provided in a molar ratio relative to the phosphorus pentasulfide of about 4:1 to about 10:1; and/or wherein the unsaturated carboxylic acid is provided in a molar ratio relative to the organic hydroxy compound of about 0.01:1 to about 0.5:1.

In yet a further approach or embodiment, an oil-soluble phosphorus antiwear additive is described herein wherein the additive is made by a process comprising the steps of (a) reacting an organic hydroxy compound with phosphorus pentasulfide to form a reaction product; (b) distilling the reaction product and recovering a condensate therefrom; and (c) reacting the condensate with an unsaturated carboxylic acid to form the oil-soluble phosphorus antiwear additive. In yet other embodiments, the oil-soluble phosphorus antiwear additive may include any of the optional features or embodiments as described by any embodiment of the lubricant or method herein.

In yet further approaches or embodiments, the use of evaporation or distillation to recover a condensate from the reaction product of an organic hydroxy compound reacted with phosphorus pentasulfide is described herein and wherein the condensate is further reacted with an unsaturated carboxylic acid to form the oil-soluble phosphorus antiwear additive. The use herein may include any further embodiment as described in this Summary Other embodiments of the present disclosure will be apparent to those skilled in the art from consideration of the specification and practice of the invention disclosed herein. The following definitions of terms are provided in order to clarify the meanings of certain terms as used herein.

The terms "gear oil," "gear fluid," "gear lubricant," "base gear lubricant," "lubricating oil," "lubricant composition," "lubricating composition," "lubricant" and "lubricating fluid" refer to a finished lubrication product comprising a major amount of a base oil plus a minor amount of an additive composition as discussed herein. In one approach, such fluids are for use in extreme pressure situations such as for transmissions and gear drive components having metal-on-metal contact situations, for instance, in a transmission and/or a limited-slip differential. In other approaches, such fluids are for use in lubricating an engine.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having a predominantly hydrocarbon character. Each hydrocarbyl group is independently selected from hydrocarbon substituents, and substituted hydrocarbon substituents containing one or more of halo groups, hydroxyl groups, alkoxy groups, mercapto groups, nitro groups, nitroso groups, amino groups, pyridyl groups, furyl groups, imidazolyl groups, oxygen and nitrogen, and wherein no more than two non-hydrocarbon substituents are present for every ten carbon atoms in the hydrocarbyl group.

As used herein, the term "percent by weight" or "wt %", unless expressly stated otherwise, means the percentage the recited component represents to the weight of the entire composition. All percent numbers herein, unless specified otherwise, is weight percent.

The terms "soluble," "oil-soluble," or "dispersible" used herein may, but does not necessarily, indicate that the compounds or additives are soluble, dissolvable, miscible, or capable of being suspended in the oil in all proportions. The foregoing terms do mean, however, that they are, for instance, soluble, suspendable, dissolvable, or stably dispersible in oil to an extent sufficient to exert their intended effect in the environment in which the oil is employed.

Moreover, the additional incorporation of other additives may also permit incorporation of higher levels of a particular additive, if desired.

The term "alkyl" as employed herein refers to straight, branched, cyclic, and/or substituted saturated chain moieties from about 1 to about 200 carbon atoms. The term "alkenyl" as employed herein refers to straight, branched, cyclic, and/or substituted unsaturated chain moieties from about 3 to about 30 carbon atoms. The term "aryl" as employed herein refers to single and multi-ring aromatic compounds that may include alkyl, alkenyl, alkylaryl, amino, hydroxyl, alkoxy, halo substituents, and/or heteroatoms including, but not limited to, nitrogen, and oxygen.

As used herein, the molecular weight is determined by gel permeation chromatography (GPC) using commercially available polystyrene standards (with a Mn of about 180 to about 18,000 as the calibration reference). The molecular weight (Mn) for any embodiment herein may be determined with a gel permeation chromatography (GPC) instrument obtained from Waters or the like instrument and the data processed with Waters Empower Software or the like software. The GPC instrument may be equipped with a Waters Separations Module and Waters Refractive Index detector (or the like optional equipment). The GPC operating conditions may include a guard column, 4 Agilent PLgel columns (length of 300×7.5 mm; particle size of 5μ, and pore size ranging from 100-10000 Å) with the column temperature at about 40° C. Un-stabilized HPLC grade tetrahydrofuran (THF) may be used as solvent, at a flow rate of 1.0 mL/min. The GPC instrument may be calibrated with commercially available polystyrene (PS) standards having a narrow molecular weight distribution ranging from 500-380,000 g/mol. The calibration curve can be extrapolated for samples having a mass less than 500 g/mol. Samples and PS standards can be in dissolved in THE and prepared at concentration of 0.1-0.5 weight percent and used without filtration. GPC measurements are also described in U.S. Pat. No. 5,266,223, which is incorporated herein by reference. The GPC method additionally provides molecular weight distribution information; see, for example, W. W. Yau, J. J. Kirkland and D. D. Bly, "Modern Size Exclusion Liquid Chromatography", John Wiley and Sons, New York, 1979, also incorporated herein by reference.

It is to be understood that throughout the present disclosure, the terms "comprises," "includes," "contains," etc. are considered open-ended and include any element, step, or ingredient not explicitly listed. The phrase "consists essentially of" is meant to include any expressly listed element, step, or ingredient and any additional elements, steps, or ingredients that do not materially affect the basic and novel aspects of the invention. The present disclosure also contemplates that any composition described using the terms, "comprises," "includes," "contains," is also to be interpreted as including a disclosure of the same composition "consisting essentially of" or "consisting of" the specifically listed components thereof.

FIGURES

DETAILED DESCRIPTION

Figure 1:
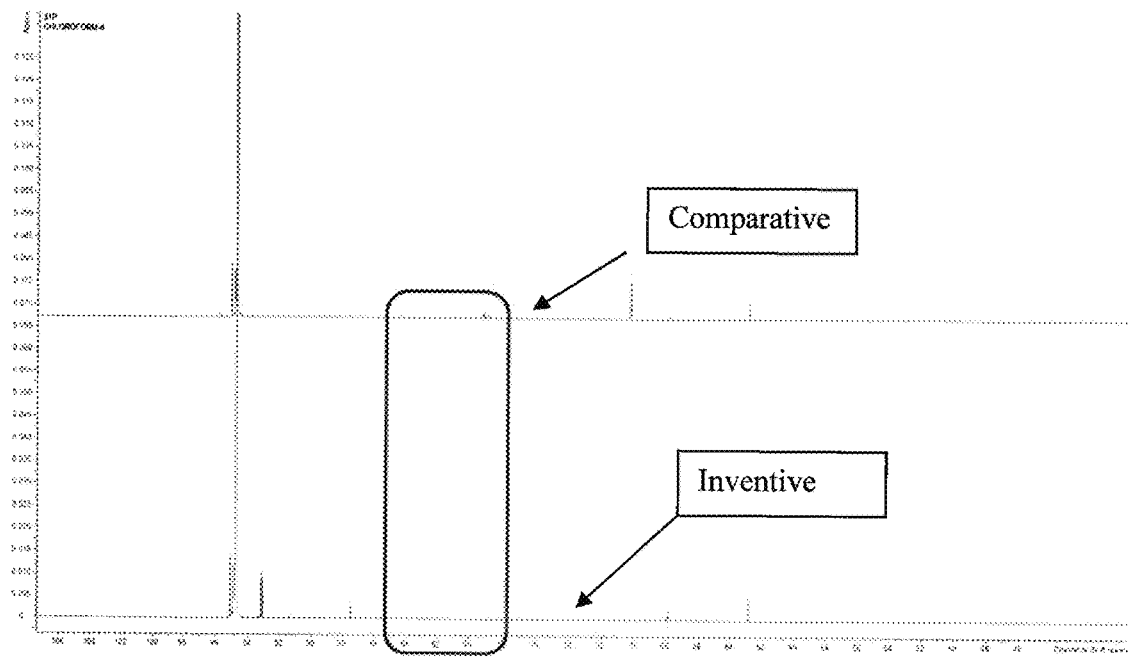
FIG. 1 is a $^{31}P$ NMR spectra of Comparative and Inventive hydraulic fluids including alkylated diisobutyl dithiophosphate antiwear additives of the present disclosure.

Disclosed herein are improved ashless antiwear additives and lubricating compositions including such improved ashless antiwear additives providing good antiwear performance with improved copper corrosion at the same time. In one approach or embodiment, the ashless antiwear additives are oil-soluble phosphorus antiwear additives. In one aspect, the lubricating compositions herein include at least one or more base oils of lubricating viscosity and a novel ashless dithiophosphate ester antiwear additive. In another aspect, the oil-soluble phosphorus antiwear additives herein are prepared by (a) reacting an organic hydroxy compound with phosphorus pentasulfide to form a reaction product; (b) evaporating and/or distilling the reaction product and recovering a condensate therefrom to provide a distilled reaction product including a diester of a dithiophosphoric acid; and (c) reacting the condensate with an organic compound, such as an unsaturated carboxylic acid, to form the improved oil-soluble phosphorus antiwear additive. The improved oil-soluble phosphorus antiwear additives of the present disclosure exhibit good antiwear performance (as measured by 4-ball testing pursuant to ASTM D4172 at 1200 rpm, 40 kg, 75° C., 1 hour) and also exhibit good copper corrosion performance at the same time (as measured pursuant to ASTM D4951).

As described more below, the improved performance of the oil-soluble phosphorus antiwear additives and lubricating compositions including such antiwear additives is the result, in some embodiments, of evaporating and/or distilling the reaction product of the organic hydroxy compound and the phosphorus pentasulfide and recovering a condensate from the distillation. In some approaches or embodiments, the condensate from the evaporation and/or distillation includes an isolated and/or improved dithiophosphoric acid intermediate (i.e., a distilled diester of dithiophosphoric acid) for reacting with a wide variety of organic compounds, such as discussed more below unsaturated carboxylic acids, to form the improved oil-soluble phosphorus antiwear additives of this disclosure.

The oil-soluble phosphorus antiwear additives herein can be prepared in a number of ways, but preferably are prepared by first reacting an organic hydroxy compound, such as, an alcohol or a phenol, with phosphorus pentasulfide (optionally in the presence of caprolactam). In some approaches, the phosphorus pentasulfide may be a monomer or dimer thereof. Suitable organic hydroxy compounds may include normal straight chain alcohols, branched chain alcohols, hydroxy aryl compounds, such as phenol and naphthol, substituted aryl hydroxy compounds, such as diamyl phenol, or any other hydroxy organic material in which the hydroxy group will react with the phosphorus pentasulfide, In one approach, the staring alcohols are saturated alcohols or substituted aryl hydroxy compounds such as aryl hydroxy compounds substituted by saturated alkyl radicals. In some approaches, the organic hydroxy compound may be a C1 to C10 (in other approaches, a C1 to C6) linear or branched alcohols, a hydroxy aryl compound, or mixtures thereof such as one or more of methyl alcohol, ethyl alcohol, propyl alcohol, isopropyl alcohol, butyl alcohol, isobutyl alcohol, tert-butyl alcohol, sec-butyl alcohol, phenol, naphthol, an amyl alcohol, hexyl alcohol, iso-hexyl alcohol, octyl alcohol, decyl alcohol, dodecyl alcohol, octadecyl alcohol, 2-ethylhexyl alcohol, 4-methyl-2-pentyl alcohol, phenyl alcohol, butylphenyl alcohol, cyclohexyl alcohol, methylcyclopentyl alcohol, propenyl alcohol, butenyl alcohol, or combinations thereof. Preferred organic hydroxy compounds herein include C1 to C4 alcohols such as ethyl alcohol, propyl alcohol, or isopropyl alcohol, and most preferably, the organic hydroxy compound is isobutyl alcohol.

The resultant reaction product of the organic hydroxy compound and the phosphorus pentasulfide may include various residual side reactants including polysulfides, such as polysulfides of diesters of dithiophosphoric acids. An exemplary reaction scheme of the first reaction step is shown below in Scheme I (with $R_1$ being a C1 to C10 linear or branched alcohol, a hydroxy aryl compound, or other alcohol as defined above and, preferably isobutyl alcohol or a isobutyl group) to form a reaction product including one or more diesters of dithiophosphoric acids and various phosphorus polysulfides side reactants including at least the exemplary diisobutyl dithiophosphoric acid phosphorus polysulfide species shown below where x is an integer from 1 to 6 (in some approaches, 1-3, or 1-5, or 2-5, or 3-5, or 4-5).

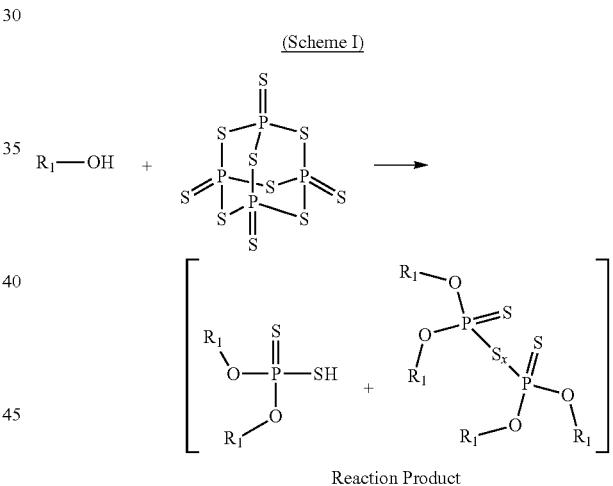

Reaction Product

Before further reactions, the above described reaction product, which includes at least the diesters of dithiophosphoric acids and the various residual phosphorus polysulfides is further processed using evaporation or distillation techniques to isolate the desired diesters of dithiophosphoric acids from the undesired phosphorus polysulfides within the reaction product. Any number of evaporation and/or distillation techniques may be used to achieve this separation and isolation of the desired diesters of dithiophosphoric acids. For instance, suitable evaporation and/or distillation may be conducted using a falling-film evaporator, a wiped-film evaporator, a thin-film evaporator, a short-path evaporation/distillation, a spinning-cone evaporator, an evaporative scraped surface heat exchanger, a rising-film evaporator, centrifugal distillation, and the like, or combinations thereof as needed for a particular application. One or more of each unit operation may be used in parallel or in series as needed for a particular application.

In one approach, a suitable evaporator typically includes a cylindrical heated body and a rotor. Typically, the intermediate reaction mixture described above, enters the heated body at the top, and is evenly distributed over a heated inner surface by the rotor. Volatile components are rapidly evaporated (in this case, the desired distilled diesters of dithiophosphoric acids), while non-volatile components (in this case, the undesired polysulfide residual products) are discharged at the bottom outlet. More specifically, a suitable evaporator may include an upright cylindrical vessel with a vertical rotor shaft extending concentrically within the vessel. An inlet supplies material to be evaporated to a distributor mechanism that spreads the material in a thin film around the inner wall of the vessel and may include one or more wiper assemblies connected to the rotor shaft below the distributor operative to form the thin liquid film on the inner wall. The heating of the inner wall then evaporates the liquid film. An internal condenser, often located in the center of the cylindrical body, is used to condense the distillate phase, which may be collected in a suitable tank. The non-volatile bottoms with the undesired polysulfide components are collected in a separate tank and thereby separated from the upper volatiles with the desired diesters of dithiophosphoric acid that are condensed into the distillate.

The separation techniques include a combination of selected pressures and temperatures of the evaporator or distillation to isolate and separate the desired products. In approaches or embodiments, the distillation of the reaction product including the mixture of the diester of dithiophosphoric acids and phosphorus polysulfides noted above may preferably occur in a wiped-film or short-path evaporator. Suitable distillation conditions may include a temperature of at least about 50° C., at least about 80° C. (and preferably about 90° C. to about 120° C., and more preferably about 90° C. to about 105° C.) combined with a suitable pressure of at least about 0.1 torr, or about 0.3 torr to about 1.0 torr, or about 0.4 torr to about 1 torr (preferably about 0.4 torr to about 0.6 torr, and more preferably about 0.45 torr to about 0.55 torr). A condensate may be recovered from the distillation at a temperature of about 10° C. or less (and preferably about 2° C. to about 8° C., and more preferably about 4° C. to about 6° C.). In approaches, the distillation may include a split ratio of distillate (that is recovered as condensate) to bottoms or residue of about 90 to 98 percent distillate to about 2 to about 10 percent residue or bottoms. In one approach using the wiped or thin-film evaporator, the residence time of the components of the composition in the heated device is short because the thin film allows for relatively rapid distillation and/or evaporation.

The condensate from the distillation includes the desired diesters of dithiophosphoric acids (e.g., dialkyl dithiophosphoric acid(s)) that is substantially free of the phosphorus polysulfides from the reaction product. In one approach, the dialkyl dithiophosphoric acids in the condensate may include one or more of dipropyl dithiophosphoric acid, diisopropyl dithiophosphoric acid, dibutyl dithiophosphoric acid, diisobutyl dithiophosphoric acid, or combinations thereof and, preferably, includes diisobutyl dithiophosphoric acid. Without wishing to be limited by theory, it is believed that the condensate is substantially free of the phosphorus polysulfides from the above-described reaction product and, in such content, may include less than about 1 weight percent, less than about 0.5 weight percent, or less than about 0.25 weight percent of any phosphorus polysulfides, such as phosphorus polysulfides of diesters of dithiophosphoric acids.

The condensate from the evaporation or distillation including the distilled diesters of dithiophosphoric acids are then further reacted in a second step with another organic compound, which is preferably an unsaturated carboxylic acid, to form the oil-soluble phosphorus antiwear additives of the present disclosure. A wide variety of unsaturated carboxylic acids or fatty acids may be used for this further reaction, including those that have other functional groups in addition to multiple bonds. Preferred unsaturated carboxylic acids for the second reaction step may include C1 to C20 unsaturated fatty acids such as acrylic acid, methacrylic acid, 2-ethyl acrylic acid, or combinations thereof (As used herein, (meth)acrylic acid refers to either acrylic acid or methacrylic acid.) The reaction may be carried out at about 50° C. to about 100° C. for about 2 to about 4 hours or as needed to achieve the desired final product. The resultant ashless dithiophosphate ester antiwear additive may include alkylated dithiophosphate esters such as 3-((di-isobutoxyphosphorothioyl)thio)-2methylpropanoic acid, 3-((di-isopropoxy phosphorothioyl)thio)-2methylpropanoic acid, 3-((di-butoxyphosphorothioyl)thio)-2methylpropanoic acid, 3-((di-propoxyphosphorothioyl)thio)-2methylpropanoic acid, and the like ashless thiophosphate antiwear additives. An exemplary reaction Scheme II for the second reaction step of the condensate is shown below with $R_1$ as defined above (preferably, an isobutyl group) and $R_2$ being hydrogen or a methyl group (preferably a methyl group):

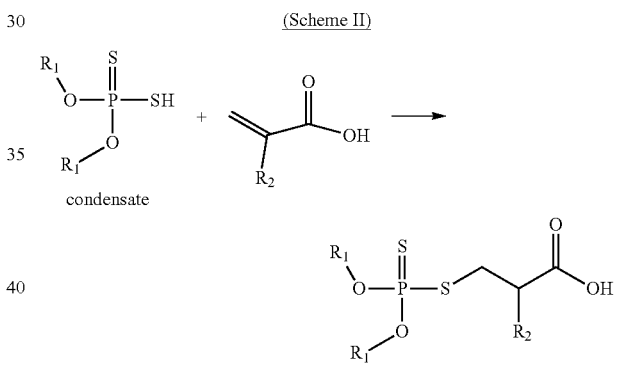

(Scheme II)

In one approach or embodiment, the oil-soluble phosphorus antiwear additives herein may be prepared by reacting, in a first reaction step, the above-described organic hydroxy compound (preferably isobuty alcohol) and the phosphorus pentasulfide in a molar ratio of the organic hydroxyl compound to the phosphorus pentasulfide of about 4:1 to about 10:1 to form the reaction product. The reaction product is then distilled and a condensate recovered from the distillate including the dialkyl dithiophosphoric acid that is preferably substantially free of the phosphorus polysulfide products. The condensate is then further reacted, in a second reaction step, with the above-described unsaturated carboxylic acid (preferably methacrylic acid) and wherein a molar ratio of the unsaturated carboxylic acid to the organic hydroxy compound is about 0.01:1 to about 0.5:1. The resultant oil-soluble phosphorus antiwear additive may preferably be used in a lubricating composition in amounts of about 0.1 to about 5 weight percent, in other approaches, about 0.1 to about 2.0 weight percent, and in further approaches, about 0.2 to about 0.5 weight percent.

Base Oil

In one approach, suitable base oils for use in the lubricating composition herein with the novel ashless antiwear additives include mineral oils, synthetic oils, and include all common lubricating basestocks. The mineral oil may be naphthenic or paraffinic. The mineral oil may be refined by conventional methodology using acid, alkali, and clay or other agents such as aluminium chloride, or may be an extracted oil produced, e.g. by solvent extraction with solvents such as phenol, sulfur dioxide, furfural or dichlorodiethyl ether. The mineral oil may be hydrotreated or hydrofined, dewaxed by chilling or catalytic dewaxing processes, or hydrocracked, such as the Yubase® family of hydrocracked base oils from SK Innovation Co., Ltd. (Seoul, Korea). The mineral oil may be produced from natural crude sources or be composed of isomerized wax materials or residues of other refining processes.

The base oil or base oil of lubricating viscosity used in the compositions herein may be selected from base oils in Groups I-V as specified in the American Petroleum Institute (API) Base Oil Interchangeability Guidelines. These three base oil groups are as follows:

TABLE 1

Base oil Types

| Base oil Category | Sulfur (%) | | Saturates (%) | Viscosity Index |
|---|---|---|---|---|
| Group I | >0.03 | and/or | <90 | 80 to 120 |
| Group II | ≤0.03 | and | ≥90 | 80 to 120 |
| Group III | ≤0.03 | and | ≥90 | ≥120 |
| Group IV | All polyalphaolefins (PAOs) | | | |
| Group V | All others not included in Groups I, II, III, or IV | | | |

Groups I, II, and III are mineral oil process stocks and may be preferred for the fluids of the present application. It should be noted that although Group III base oils are derived from mineral oil, the rigorous processing that these fluids undergo causes their physical properties to be very similar to some true synthetics, such as PAOs. Therefore, oils derived from Group III base oils may be referred to as synthetic fluids in the industry. Suitable oils may be derived from hydrocracking, hydrogenation, hydrofinishing, unrefined, refined, and re-refined oils, and mixtures thereof. In some approaches, the base oil may be a blend of Group I, Group II, and/or Group III oils and the blend may be about 0% to about 100% of the Group I oil, about 0% to about 100% of the Group II oil, about 0% to about 100% of the Group III oil, or various blends of Group I and II, Group I and III, or Group II and III oil blends.

Unrefined oils are those derived from a natural, mineral, or synthetic source without or with little further purification treatment. Refined oils are similar to the unrefined oils except that they have been treated in one or more purification steps, which may result in the improvement of one or more properties. Examples of suitable purification techniques are solvent extraction, secondary distillation, acid or base extraction, filtration, percolation, and the like. Oils refined to the quality of an edible may or may not be useful. Edible oils may also be called white oils. In some embodiments, lubricating oil compositions are free of edible or white oils.

Re-refined oils are also known as reclaimed or reprocessed oils. These oils are obtained similarly to refined oils using the same or similar processes. Often these oils are additionally processed by techniques directed to removal of spent additives and oil breakdown products.

Mineral oils may include oils obtained by drilling or from plants and animals or any mixtures thereof. For example, such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully hydrogenated, if desired. Oils derived from coal or shale may also be useful.

The major amount of base oil included in the fluids herein may be selected from the group consisting of Group I, Group II, a Group III, and a combination of two or more of the foregoing, and wherein the major amount of base oil is other than base oils that arise from provision of additive components or viscosity index improvers in the composition. In another embodiment, the major amount of base oil included in a lubricating composition may be selected from the group consisting of Group I, a Group II, and a combination of two or more of the foregoing, and wherein the major amount of base oil is other than base oils that arise from provision of additive components or viscosity index improvers in the composition.

The base oil may also be any of the synthetic base oils from API Group IV or V and/or combinations of synthetic base oils with mineral base oils. Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as α-olefins, and mixtures thereof, alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof. Polyalphaolefins are typically hydrogenated materials.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

The amount of the base oil of lubricating viscosity in the compositions herein may be the balance remaining after subtracting from 100 wt % the sum of the amount of the performance additives. For example, the oil of lubricating viscosity that may be present in a finished fluid may be a "major amount," such as greater than about 50 wt %, greater than about 60 wt %, greater than about 70 wt %, greater than about 80 wt %, greater than about 85 wt %, greater than about 90 wt %, or greater than 95 wt %.

In some approaches, a preferred base oil or base oil of lubricating viscosity has less than about 25 ppm sulfur, a viscosity index greater than about 120, and a kinematic viscosity at about 100° C. of about 2 to about 8 cSt. In other approaches, the base oil of lubricating viscosity has less than about 25 ppm sulfur, a viscosity index greater than 120, and a kinematic viscosity at 100° C. of about 4 cSt. The base oil may have CP (paraffinic carbon content) of greater than 40%, greater than 45%, greater than 50%, greater than 55%, or greater than 90%. The base oil may have a CA (aromatic carbon content) of less than 5%, less than 3%, or less than 1%. The base oil may have a CN (naphthenic carbon content) of less than 60%, less than 55%, less than 50%, or less than 50% and greater than 30%. The base oil may have a ratio of 1 ring naphthenes to 2-6 ring naphthenes of less than 2 or less than 1.5 or less than 1.

A suitable lubricant composition herein may include additive components in the ranges listed in the following Table 2.

TABLE 2

Suitable and Preferred Driveline or Gear Fluid Compositions

| Component | Wt % (Suitable Embodiments) | Wt % (Preferred Embodiments) |
|---|---|---|
| Oil soluble phosphorus antiwear | 0.1 to 5.0 | 0.1 to 0.5 |
| Antioxidant(s) | 0.1-5.0 | 0.01-4.0 |
| Detergent(s) | 0.0-15.0 | 1.0-8.0 |
| Ashless TBN booster(s) | 0.0-1.0 | 0.01-0.5 |
| Corrosion inhibitor(s) | 0.0-5.0 | 0.1-3.0 |
| Metal dihydrocarbyl dithiophosphate(s) | 0.0-15.0 | 0.1-5.0 |
| Other Ash-free phosphorus compound(s) | 0.0-15.0 | 0.1-5.0 |
| Antifoaming agent(s) | 0.0-1.0 | 0.001-0.5 |
| Antiwear agent(s) | 0.0-1.0 | 0.0-0.8 |
| Pour point depressant(s) | 0.0-1.0 | 0.01-0.5 |
| Viscosity index improver(s) | 0.0-20.0 | 0.1-10.0 |
| Dispersants | 0.0-10.0 | 1.0-6.0 |
| Dispersant viscosity index improver(s) | 0.0-10.0 | 0.0-5.0 |
| Friction modifier(s) | 0.0-10.0 | 0.01-4.0 |
| Extreme Pressure Agent | 0.0-1.05 | 0.035-.35 |
| Base oil(s) | Balance | Balance |
| Total | 100 | 100 |

The percentages of each component above represent the weight percent of each component, based upon the weight of the total final additive or lubricating oil composition. The balance of the lubricating oil composition consists of one or more base oils or solvents. Additives used in formulating the compositions described herein may be blended into the base oil or solvent individually or in various sub-combinations. However, it may be suitable to blend all of the components concurrently using an additive concentrate (i.e., additives plus a diluent, such as a hydrocarbon solvent).

The lubricating compositions described herein with the improved ashless dithiophosphate ester antiwear reaction products of the present disclosure exhibit good antiwear performance (as measured by 4-ball testing pursuant to ASTM D4172 at 1200 rpm, 40 kg, 75° C., 1 hour) and also exhibit good copper corrosion performance at the same time (as measured pursuant to ASTM D130 and ASTM D4951). For instance the lubricating compositions may exhibit a wear scar of about 0.350 to about 0.460 mm (preferably, about 0.350 mm to about 0.410 mm, or more preferably, about 0.350 mm to about 0.370 mm). At the same time, the lubricating composition may exhibit copper corrosion of 150 ppm or less copper, more preferably 80 ppm or less copper, in other approaches, about 50 ppm or less, about 30 ppm or less, and in some approaches, about 5 ppm or less copper as measured by ASTM D130 and D4951 per the Examples.

In one approach, the lubricating composition herein are suitable for a hydraulic fluid or a driveline lubricating compositions and may be used for lubricating a machine part, such as a gear, transmission, or gear box component. Lubricating fluids according to the present disclosure can be used in gear applications, such as industrial gear applications, automotive gear applications, axles, and stationary gearboxes. Gear-types can include, but are not limited to, spur, spiral, worm, rack and pinion, involute, bevel, helical, planetary, and hypoid gears and as well as limited-slip applications and differentials. The driveline lubricating compositions disclosed herein are also suitable for automatic or manual transmissions, including step automatic transmissions, continuously variable transmissions, semi-automatic transmissions, automated manual transmissions, toroidal transmissions, and dual clutch transmissions.

Optional Additives

In other approaches, the lubricating compositions herein including such additives noted above may also include one or more optional components so long as such components and amounts thereof do not impact the performance characteristics as described in the above paragraphs. These optional components are described in the following paragraphs.

Other Phosphorus-Containing Compounds

The lubricant composition herein may comprise one or more phosphorus-containing compounds that may impart anti-wear benefits to the fluid. The one or more phosphorus-containing compounds may be present in the lubricating oil composition in an amount ranging from about 0 wt % to about 15 wt %, or about 0.01 wt % to about 10 wt %, or about 0.05 wt % to about 5 wt %, or about 0.1 wt % to about 3 wt % of the lubricating oil composition. The phosphorus-containing compound may provide up to 5000 ppm phosphorus, or from about 50 to about 5000 ppm phosphorus, or from about 300 to about 1500 ppm phosphorus, or up to 600 ppm phosphorus, or up to 900 ppm phosphorus to the lubricant composition.

The one or more phosphorus-containing compounds may include ashless phosphorus-containing compounds. Examples of suitable phosphorus-containing compound include, but are not limited to, thiophosphates, dithiophosphates, phosphates, phosphoric acid esters, phosphate esters, phosphites, phosphonates, phosphorus-containing carboxylic esters, ethers, or amides salts thereof, and mixtures thereof. Phosphorus containing anti-wear agents are more fully described in European Patent 0612839.

It should be noted that often the term phosphonate and phosphite are used often interchangeably in the lubricant industry. For example, dibutyl hydrogen phosphonate is often referred to as dibutyl hydrogen phosphite. It is within the scope of the present invention for the inventive lubricant composition to include a phosphorus-containing compound that may be referred to as either a phosphite or a phosphonate.

In any of the above-described phosphorus-containing compounds, the compound may have about 5 to about 20 weight percent phosphorus, or about 5 to about 15 weight percent phosphorus, or about 8 to about 16 weight percent phosphorus, or about 6 to about 9 weight percent phosphorus.

In some embodiments, the ashless phosphorus-containing compound may be dialkyl dithiophosphate ester, amyl acid phosphate, diamyl acid phosphate, dibutyl hydrogen phosphonate, dimethyl octadecyl phosphonate, salts thereof, and mixtures thereof.

The ashless phosphorus-containing compound may be have the formula:

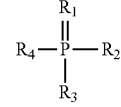

(Formula XIV)

wherein R1 is S or O; R2 is —OR", —OH, or —R"; R3 is —OR", —OH, or SR'"C(O)OH; R4 is —OR"; R'" is C1 to C3 branched or linear alkyl chain; and R" is a C1 to C18 hydrocarbyl chain. When the phosphorous-containing compound has the structure shown in Formula XIV, the compound may have about 8 to about 16 weight percent phosphorus.

In some embodiments the lubricant composition comprises a phosphorus-containing compound of Formula XIV wherein R1 is S; R2 is —OR"; R3 is S R'"COOH; R4 is —OR"; R'" is C3 branched alkyl chain; R" is C4; and wherein the phosphorus-containing compound is present in an amount to deliver between 80-900 ppm phosphorus to the lubricant composition.

In another embodiment, the lubricant composition comprises a phosphorus-containing compound of Formula XIV wherein R1 is O; R2 is —OH; R3 is —OR" or —OH; R4 is —OR"; R" is C5; and wherein phosphorus-containing compound is present in an amount to deliver between 80-1500 ppm phosphorus to the lubricant composition.

In yet another embodiment, the lubricant composition comprises a phosphorus-containing compound of Formula XIV wherein R1 is O; R2 is OR"; R3 is H; R4 is —OR"; R" is C4; and wherein the one or more phosphorus-containing compound(s) is present in an amount to deliver between 80-1550 ppm phosphorus to the lubricant composition.

In other embodiments, the lubricant composition comprises a phosphorus-containing compound of Formula XIV wherein R1 is O; R2 is —R"; R3 is —OCH3 or —OH; R4 is —OCH3; R" is C18; and wherein the one or more phosphorus-containing compound(s) is present in an amount to deliver between 80-850 ppm phosphorus to the lubricant composition.

In some embodiments, the phosphorus-containing compound has the structure shown in Formula XIV and delivers about 80 to about 4500 ppm phosphorus to the lubricant composition. In other embodiments, the phosphorus-containing compound is present in an amount to deliver between about 150 and about 1500 ppm phosphorus, or between about 300 and about 900 ppm phosphorus, or between about 800 to 1600 ppm phosphorus, or about 900 to about 1800 ppm phosphorus, to the lubricant composition.

Other Anti-Wear Agents

The lubricant composition may also include anti-wear agents that are non-phosphorus-containing compounds. Examples of such antiwear agents include borate esters, borate epoxides, thiocarbamate compounds (including thiocarbamate esters, alkylene-coupled thiocarbamates, and bis (S-alkyldithiocarbamyl)disulfides, thiocarbamate amides, thiocarbamic ethers, alkylene-coupled thiocarbamates, and bis(S-alkyldithiocarbamyl) disulfides, and mixtures thereof), sulfurized olefins, tridecyl adipate, titanium compounds, and long chain derivatives of hydroxyl carboxylic acids, such as tartrate derivatives, tartramides, tartrimides, citrates, and mixtures thereof. A suitable thiocarbamate compound is molybdenum dithiocarbamate. Suitable tartrate derivatives or tartrimides may contain alkyl-ester groups, where the sum of carbon atoms on the alkyl groups may be at least 8. The tartrate derivative or tartrimide may contain alkyl-ester groups, where the sum of carbon atoms on the alkyl groups may be at least 8. The antiwear agent may in one embodiment include a citrate. The additional anti-wear agent may be present in ranges including about 0 wt % to about 15 wt %, or about 0.01 wt % to about 10 wt %, or about 0.05 wt % to about 5 wt %, or about 0.1 wt % to about 3 wt % of the lubricating oil composition.

Other Extreme Pressure Agents

The lubricant compositions of the disclosure may also contain other extreme pressure agent(s). The extreme pressure agent may contain sulfur and may contain at least 12 percent by weight sulfur. In some embodiments, the extreme pressure agent added to the lubricating oil is sufficient to provide at least 350 ppm sulfur, 500 ppm sulfur, 760 ppm sulfur, from about 350 to about 2,000 ppm sulfur, from about 2,000 to about 30,000 ppm sulfur, or from about 2,000 to about 4,800 ppm sulfur, or about 4,000 to about 25,000 ppm sulfur to the lubricant composition.

A wide variety of sulfur-containing extreme pressure agents are suitable and include sulfurized animal or vegetable fats or oils, sulfurized animal or vegetable fatty acid esters, fully or partially esterified esters of trivalent or pentavalent acids of phosphorus, sulfurized olefins (see, for example U.S. Pat. Nos. 2,995,569; 3,673,090; 3,703,504; 3,703,505; 3,796,661; 3,873,454 4,119,549; 4,119,550; 4,147,640; 4,191,659; 4,240,958; 4,344,854; 4,472,306; and 4,711,736), dihydrocarbyl polysulfides (see for example U.S. Pat. Nos. 2,237,625; 2,237,627; 2,527,948; 2,695,316; 3,022,351; 3,308,166; 3,392,201; 4,564,709; and British 1,162,334), functionally-substituted dihydrocarbyl polysulfides (see for example U.S. Pat. No. 4,218,332), and polysulfide olefin products (see for example U.S. Pat. No. 4,795,576). Other suitable examples include organo-sulfur compounds selected from sulfurized olefins, sulfur-containing amino heterocyclic compounds, 5-dimercapto-1,3,4-thiadiazole, polysulfides having a majority of S3 and S4 sulfides, sulfurized fatty acids, sulfurized branched olefins, organic polysulfides, and mixtures thereof.

In some embodiments the extreme pressure agent is present in the lubricating composition in an amount of up to about 3.0 wt % or up to about 5.0 wt %. In other embodiments, the extreme pressure agent is present from about 0.05 wt % to about 0.5 wt %, based on the total lubricant composition. In other embodiments, the extreme pressure agent is present from about 0.1 wt % to about 3.0 wt %, based on the total lubricant composition. In other embodiments the extreme pressure agent is present in an amount between about 0.6 wt % and about 1 wt %, based on the total lubricant composition. In yet other embodiments, the detergent is present in an amount of about 1.0 wt %, based on the total lubricant composition.

One suitable class of extreme pressure agents are polysulfides composed of one or more compounds represented by the formula: Ra-Sx-Rb where Ra and Rb are hydrocarbyl groups each of which may contain 1 to 18, and in other approaches, 3 to 18 carbon atoms and x is may be in the range of from 2 to 8, and typically in the range of from 2 to 5, especially 3. In some approaches, x is an integer from 3 to 5 with about 30 to about 60 percent of x being an integer of 3 or 4. The hydrocarbyl groups can be of widely varying types such as alkyl, cycloalkyl, alkenyl, aryl, or aralkyl. Tertiary alkyl polysulfides such as di-tert-butyl trisulfide, and mixtures comprising di-tert-butyl trisulfide (e.g., a mixture composed principally or entirely of the tri, tetra-, and pentasulfides) may be used. Examples of other useful dihydrocarbyl polysulfides include the diamyl polysulfides, the dinonyl polysulfides, the didodecyl polysulfides, and the dibenzyl polysulfides.

Another suitable class of extreme pressure agent is sulfurized isobutenes made by reacting an olefin, such as isobutene, with sulfur. Sulfurized isobutene (SIB), notably sulfurized polyisobutylene, typically has a sulfur content of from about 10 to about 55%, desirably from about 30 to about 50% by weight. A wide variety of other olefins or unsaturated hydrocarbons, e.g., isobutene dimer or trimer, may be used to form the sulfurized olefin extreme pressure agents. Various methods have been disclosed in the prior art for the preparation of sulfurized olefins. See, for example, U.S. Pat. No. 3,471,404 to Myers; U.S. Pat. No. 4,204,969 to Papay et al.; U.S. Pat. No. 4,954,274 to Zaweski et al.; U.S. Pat. No. 4,966,720 to DeGonia et al.; and U.S. Pat. No. 3,703,504 to Horodysky, et al, each of which his incorporated herein by reference.

Methods for preparing sulfurized olefins, including the methods disclosed in the aforementioned patents, generally involve formation of a material, typically referred to as an "adduct", in which an olefin is reacted with a sulfur halide, for example, sulfur monochloride. The adduct is then reacted with a sulfur source to provide the sulfurized olefin. The quality of a sulfurized olefin is generally measured by various physical properties, including, for example, viscosity, sulfur content, halogen content and copper corrosion test weight loss. U.S. Pat. No. 4,966,720, relates to sulfurized olefins useful as extreme pressure additives in lubrication oils and to a two stage reaction for their preparation.

Antioxidants

The lubricating oil compositions herein also may optionally contain one or more antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidant compounds may be used alone or in combination.

The hindered phenol antioxidant may contain a secondary butyl and/or a tertiary butyl group as a sterically hindering group. The phenol group may be further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox® L-135 available from BASF or an addition product derived from 2,6-di-tert-butylphenol and an alkyl acrylate, wherein the alkyl group may contain about 1 to about 18, or about 2 to about 12, or about 2 to about 8, or about 2 to about 6, or about 4 carbon atoms. Another commercially available hindered phenol antioxidant may be an ester and may include Ethanox® 4716 available from Albemarle Corporation.

Useful antioxidants may include diarylamines and phenols. In an embodiment, the lubricating oil composition may contain a mixture of a diarylamine and a phenol, such that each antioxidant may be present in an amount sufficient to provide up to about 5 wt %, based on the weight of the lubricant composition. In an embodiment, the antioxidant may be a mixture of about 0.3 to about 1.5 wt % diarylamine and about 0.4 to about 2.5 wt % phenol, based on the lubricant composition.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In one embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as α-olefins.

The one or more antioxidant(s) may be present in ranges about 0 wt % to about 20 wt %, or about 0.1 wt % to about 10 wt %, or about 1 wt % to about 5 wt %, of the lubricating oil composition.

Dispersants

Dispersants contained in the lubricant composition may include, but are not limited to, an oil soluble polymeric hydrocarbon backbone having functional groups that are capable of associating with particles to be dispersed. Typically, the dispersants comprise amine, alcohol, amide, or ester polar moieties attached to the polymer backbone often via a bridging group. Dispersants may be selected from Mannich dispersants as described in U.S. Pat. Nos. 3,634,515, 3,697,574 and 3,736,357; ashless succinimide dispersants as described in U.S. Pat. Nos. 4,234,435 and 4,636,322; amine dispersants as described in U.S. Pat. Nos. 3,219,666, 3,565,804, and 5,633,326; Koch dispersants as described in U.S. Pat. Nos. 5,936,041, 5,643,859, and 5,627,259, and polyalkylene succinimide dispersants as described in U.S. Pat. Nos. 5,851,965; 5,853,434; and 5,792,729.

In some embodiments, the additional dispersant may be derived from a polyalphaolefin (PAO) succinic anhydride, an olefin maleic anhydride copolymer. As an example, the additional dispersant may be described as a poly-PIBSA. In another embodiment, the additional dispersant may be derived from an anhydride which is grafted to an ethylene-propylene copolymer. Another additional dispersant may be a high molecular weight ester or half ester amide.

The additional dispersant, if present, can be used in an amount sufficient to provide up to about 10 wt %, based upon the final weight of the lubricating oil composition. Another amount of the dispersant that can be used may be about 0.1 wt % to about 10 wt %, or about 0.1 wt % to about 10 wt %, or about 3 wt % to about 8 wt %, or about 1 wt % to about 6 wt %, based upon the final weight of the lubricating oil composition.

Viscosity Index Improvers

The lubricant compositions herein also may optionally contain one or more viscosity index improvers. Suitable viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. Viscosity index improvers may include star polymers and suitable examples are described in US Publication No. 20120101017A1, which is incorporated herein by reference.

The lubricating oil compositions herein also may optionally contain one or more dispersant viscosity index improvers in addition to a viscosity index improver or in lieu of a viscosity index improver. Suitable viscosity index improvers may include functionalized polyolefins, for example, ethylene-propylene copolymers that have been functionalized with the reaction product of an acylating agent (such as maleic anhydride) and an amine; polymethacrylates functionalized with an amine, or esterified maleic anhydride-styrene copolymers reacted with an amine.

The total amount of viscosity index improver and/or dispersant viscosity index improver may be about 0 wt % to about 20 wt %, about 0.1 wt % to about 15 wt %, about 0.1 wt % to about 12 wt %, or about 0.5 wt % to about 10 wt %, about 3 wt % to about 20 wt %, about 3 wt % to about 15 wt %, about 5 wt % to about 15 wt %, or about 5 wt % to about 10 wt %, of the lubricating oil composition.

In some embodiments, the viscosity index improver is a polyolefin or olefin copolymer having a number average molecular weight of about 10,000 to about 500,000, about 50,000 to about 200,000, or about 50,000 to about 150,000. In some embodiments, the viscosity index improver is a hydrogenated styrene/butadiene copolymer having a number average molecular weight of about 40,000 to about 500,000, about 50,000 to about 200,000, or about 50,000 to about 150,000. In some embodiments, the viscosity index improver is a polymethacrylate having a number average molecular weight of about 10,000 to about 500,000, about 50,000 to about 200,000, or about 50,000 to about 150,000.

Other Optional Additives

Other additives may be selected to perform one or more functions required of lubricant composition. Further, one or more of the mentioned additives may be multi-functional and provide functions in addition to or other than the function prescribed herein. The other additives may be in addition to specified additives of the present disclosure and/or may comprise one or more of metal deactivators, viscosity index improvers, ashless TBN boosters, antiwear agents, corrosion inhibitors, rust inhibitors, dispersants, dispersant viscosity index improvers, extreme pressure agents, antioxidants, foam inhibitors, demulsifiers, emulsifiers, pour point depressants, seal swelling agents and mixtures thereof. Typically, fully-formulated lubricating oil will contain one or more of these additives.

Suitable metal deactivators may include derivatives of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides.

Suitable foam inhibitors include silicon-based compounds, such as siloxane.

Suitable pour point depressants may include a polymethylmethacrylates or mixtures thereof. Pour point depressants may be present in an amount sufficient to provide from about 0 wt % to about 1 wt %, about 0.01 wt % to about 0.5 wt %, or about 0.02 wt % to about 0.04 wt % based upon the final weight of the lubricating oil composition.

Suitable rust inhibitors may be a single compound or a mixture of compounds having the property of inhibiting corrosion of ferrous metal surfaces. Non-limiting examples of rust inhibitors useful herein include oil-soluble high molecular weight organic acids, such as 2-ethylhexanoic acid, lauric acid, myristic acid, palmitic acid, oleic acid, linoleic acid, linolenic acid, behenic acid, and cerotic acid, as well as oil-soluble polycarboxylic acids including dimer and trimer acids, such as those produced from tall oil fatty acids, oleic acid, and linoleic acid. Other suitable corrosion inhibitors include long-chain alpha, omega-dicarboxylic acids in the molecular weight range of about 600 to about 3000 and alkenylsuccinic acids in which the alkenyl group contains about 10 or more carbon atoms such as, tetrapropenylsuccinic acid, tetradecenylsuccinic acid, and hexadecenylsuccinic acid. Another useful type of acidic corrosion inhibitors are the half esters of alkenyl succinic acids having about 8 to about 24 carbon atoms in the alkenyl group with alcohols such as the polyglycols. The corresponding half amides of such alkenyl succinic acids are also useful. A useful rust inhibitor is a high molecular weight organic acid. In some embodiments, an engine oil is devoid of a rust inhibitor.

The rust inhibitor, if present, can be used in optional amount sufficient to provide about 0 wt % to about 5 wt %, about 0.01 wt % to about 3 wt %, about 0.1 wt % to about 2 wt %, based upon the final weight of the lubricating oil composition.

The lubricant composition may also include corrosion inhibitors (it should be noted that some of the other mentioned components may also have copper corrosion inhibition properties). Suitable inhibitors of copper corrosion include ether amines, polyethoxylated compounds such as ethoxylated amines and ethoxylated alcohols, imidazolines, monoalkyl and dialkyl thiadiazole, and the like.

Thiazoles, triazoles and thiadiazoles may also be used in the lubricants. Examples include benzotriazole, tolyltriazole, octyltriazole, decyltriazole; dodecyltriazole, 2-mercaptobenzothiazole, 2,5-dimercapto-1,3,4-thiadiazole, 2-mercapto-5-hydrocarbylthio-1,3,4-thiadiazoles, and 2-mercapto-5-hydrocarbyldithio-1,3,4-thiadiazoles. In one embodiment, the lubricant composition includes a 1,3,4-thiadiazole, such as 2-hydrocarbyldithio-5-mercapto-1,3,4-dithiadiazole.

Anti-foam/Surfactant agents may also be included in a fluid according to the present invention. Various agents are known for such use. Copolymers of ethyl acrylate and hexyl ethyl acrylate, such as PC-1244, available from Solutia may be used. In other embodiments, silicone fluids, such as 4% DCF may be included. Mixtures of anti-foam agents may also be present in the lubricant composition.

EXAMPLES

The following examples are illustrative of exemplary embodiments of the disclosure. In these examples, as well as elsewhere in this application, all ratios, parts, and percentages are by weight unless otherwise indicated. It is intended that these examples are being presented for the purpose of illustration only and are not intended to limit the scope of the invention disclosed herein.

Comparative Example 1

Figure 4:
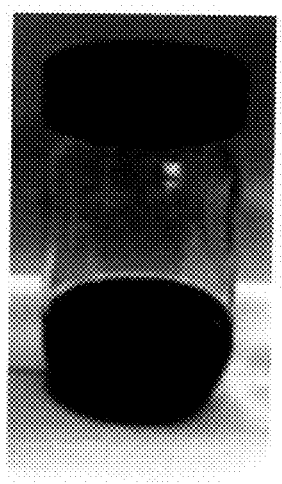
FIG. 4 is an image representing the comparative reaction product between an organic hydroxy compound and phosphorus pentasulfide.

A comparative alkylated diisobutyl dithiophosphate was prepared as follows: about 15.6 pounds of isobutanol and about 0.023 pounds of caprolactam (25% in 2-ethyl hexanol) were charged to a stainless-steel reactor and then about 11.5 pounds of phosphorus pentasulfide ($P_2S_5$ with about 27.7% phosphorus) was charged slowly to maintain the temperature in the range about 35° C. to about 77° C. under vigorous stirring. Next, about 34.4 pounds of further phosphorus pentasulfide was charged to the reactor followed by slowly adding about 46.8 pounds of isobutanol maintaining the temperature between 35° C. to about 77° C. After completing the second isobutanol charge, the reactor was maintained at about 80° C. to about 85° C. for 120 minutes to form Reaction Product A. The Reaction Product A is represented by the image of FIG. 4 and was believed to include at least the following structures of a diisobutyl dithiophosphoric acid and at least the following species of a diisobutyl dithiophosphoric acid phosphorus polysulfide with x being 1 to 6:

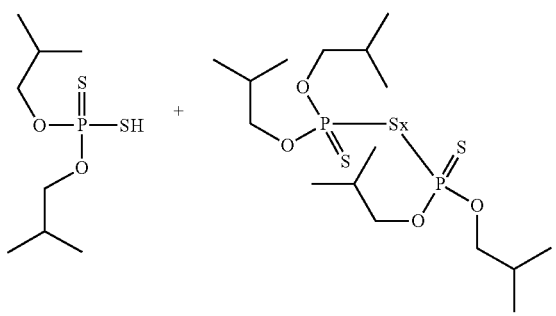

Next, an alkylated diisobutyl dithiophosphate reaction product was prepared directly from the above intermediate mixture of diisobutyl dithiophosphoric acid and phosphorus polysulfides prepared above as follows: about 81.4 g of methacrylic acid was added dropwise at about 70° C. over the course of 1 hour to about 252.4 g of the above Reaction Product A and stirred continuously for about 4 hours at about 70° C. The crude product was dissolved in about 500 ml of 2N sodium hydroxide and washed twice with about 399 ml of petroleum spirit. The solution was then acidified to a pH of 1 using concentrated hydrochloric acid and subjected to extraction with about 150 ml of petroleum spirit. The organic phase was washed with water and concentrated on a rotary evaporator to produce a comparative alkylated diisobutyl dithiophosphate antiwear additive including various phosphorus polysulfides.

Example 1

Figure 5:
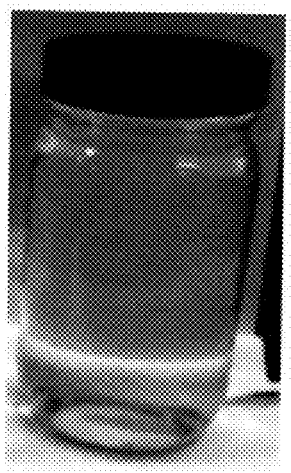
FIG. 5 is an image representing a condensate obtained from the distillation of reaction products between the organic hydroxy compound and the phosphorus pentasulfide.

The Reaction Product A including the diisobutyl dithiophosphoric acid and residual phosphorus polysulfides from Comparative Example 1 was processed in a wiped film evaporator (ICL-04 Short Path Distillation System, GIG Karasek, Austria). The wiped film evaporator was operated at a jacket temperature of about 100° C. and under a pressure of about 0.4 torr. The condenser was cooled to about 5° C. The evaporator had a split ratio of about 90% distillate and about 10% bottoms or residue. The condensate was collected as the distilled diisobutyl dithiophosphoric acid and is represented by the image of FIG. 5.

Next, an alkylated diisobutyl dithiophosphate reaction product was prepared from the condensate prepared above as follows: about 81.4 g of methacrylic acid were added dropwise at about 70° C. over the course of 1 hour to about 252.4 g of the above condensate stirred continuously for about 4 hours at about 70° C. The crude product was dissolved in about 500 ml of 2N sodium hydroxide and washed twice with about 399 ml of petroleum spirit. The solution was then acidified to a pH of 1 using concentrated hydrochloric acid and subjected to extraction with about 150 ml of petroleum spirit. The organic phase was washed with water and concentrated on a rotary evaporator to produce the alkylated diisobutyl dithiophosphate reaction product, which was believed to be substantially free of any phosphorus polysulfides.

Example 2

Hydraulic lubricating compositions including the alkylated diisobutyl dithiophosphate reaction products of Comparative Example 1 and Inventive Example 1 were prepared as set forth in Table 3 below.

TABLE 3

Comparative and Inventive Hydraulic Fluids

|  | Comparative Hydraulic Fluid, wt % | | Inventive Hydraulic Fluid, wt % | |
| --- | --- | --- | --- | --- |
|  | A | B | A | B |
| Comparative Example 1 | 5 | 2.5 | — | — |
| Example 1 | — | — | 5 | 2.5 |
| Hydraulic Additive Package* | 1.6 | 1.6 | 1.6 | 1.6 |
| Group I Base Oil | 93.4 | 95.9 | 93.4 | 95.9 |

*The hydraulic additive package included base oil, demulsifier, friction modifier, viscosity modifier, antiwear, detergent, corrosion inhibitor, and antioxidant.

FIG. 1 shows phosphorus NMR spectra of the Comparative and Inventive hydraulic fluids from Table 3 and shows that the Comparative hydraulic fluid has an additional peaks identified in the Figure believed to be the presence of various phosphorus polysulfide compositions not found in the Inventive hydraulic fluids.

Copper corrosion was evaluated following the method pursuant to ASTM D130 at 121° C. for an extended period of two days. For the test, there were three coupon vessels prepped per finished fluid (each vessel containing about 45 grams of finished fluid and a copper strip). A vessel was pulled at each time point of Table 4 and the solution was collected. Two grams of each solution was then submitted for copper corrosion pursuant to ASTM D4951 and the results are shown below in Table 4.

TABLE 4

Copper Corrosion

|  | Comparative Hydraulic Fluid (ppm of copper) | | Inventive Hydraulic Fluid (ppm of copper) | |
| --- | --- | --- | --- | --- |
|  | A | B | A | B |
| 0 | 0 | 0 | 0 | 0 |
| 3 hours | 0 | 0 | 0 | 0 |
| 24 hours | 162 | 64 | 32 | 26 |
| 48 hours | 291 | 130 | 76 | 41 |

Figure 2:
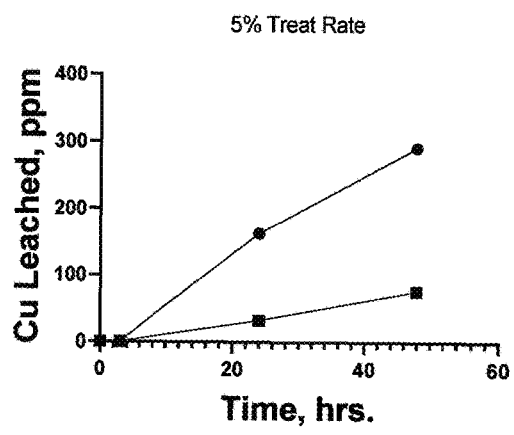
FIGS. 2 and 3 are plots of copper corrosion for two different treat rates of alkylated diisobutyl dithiophosphate antiwear additives in Comparative and Inventive hydraulic fluids.
Figure 3:
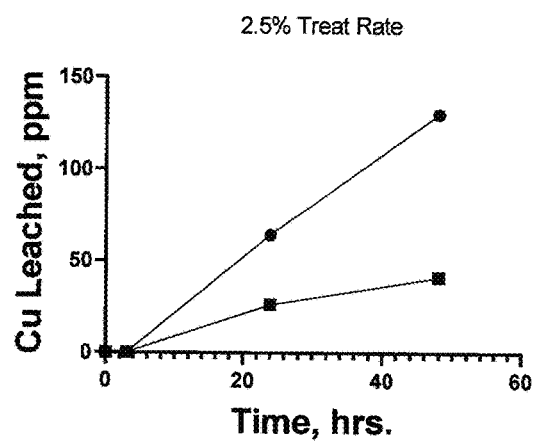

At each treat rate, the Inventive fluids exhibited about 50 to about 80 percent improvement in copper corrosion. The graphs of FIGS. 2 and 3 also show the dramatic improvement in copper corrosion between the Comparative and Inventive fluids.

The Comparative and inventive fluids were also evaluated for antiwear performance pursuant to ASTM D4172 at 1200 rpm, 40 KG of weight, 75° C., 1 hour. The results of wear scar testing is provided below in Table 5.

TABLE 5

| | Comparative Hydraulic Fluid, mm B | Inventive Hydraulic Fluid, mm B |
|---|---|---|
| Test 1 | 0.376 | 0.380 |
| Test 2 | 0.363 | 0.359 |

As shown in Table 5 above, the Inventive hydraulic fluids exhibited wear scar the same as or even slightly better than the Comparative hydraulic fluid and as shown above, dramatically improved copper corrosion.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A lubricating composition comprising:
   a majority of one or more base oils of lubricating viscosity; and
   an oil-soluble phosphorus antiwear additive made by a process comprising the steps of (a) reacting an organic hydroxy compound with phosphorus pentasulfide to form a reaction product; (b) distilling the reaction product and recovering a condensate; and (c) reacting the condensate with an unsaturated carboxylic acid to form the oil-soluble phosphorus antiwear additive.

2. The lubricating composition of claim 1, wherein the distillation occurs at one or more of a temperature of at least about 50° C., a pressure of at least about 0.1 torr, or combinations thereof; and/or wherein the condensate is recovered at a temperature of about 10° C. or less.

3. The lubricating composition of claim 1, wherein the distillation occurs in a falling-film evaporator, a wiped-film evaporator, a thin-film evaporator, a short-path evaporator, or combinations thereof.

4. The lubricating composition of claim 1, wherein the condensate includes a dialkyl dithiophosphoric acid.

5. The lubricating composition of claim 4, wherein the dialkyl dithiophosphoric acid is dipropyl dithiophosphoric acid, diisopropyl dithiophosphoric acid, dibutyl dithiophosphoric acid, diisobutyl dithiophosphoric acid, or combinations thereof.

6. The lubricating composition of claim 1, wherein the unsaturated carboxylic acid is an C1 to C20 fatty acid.

7. The lubricating composition of claim 6, wherein the unsaturated fatty acid is acrylic acid, methacrylic acid, 2-ethyl acrylic acid, or combinations thereof.

8. The lubricating composition of claim 1, wherein the organic hydroxy compound is a C1 to C6 linear or branched alcohol, a hydroxyl aryl compound, or mixtures thereof.

9. The lubricating composition of claim 8, wherein the organic hydroxy compound is methyl alcohol, ethyl alcohol, propyl alcohol, isopropyl alcohol, butyl alcohol, isobutyl alcohol, tert-butyl alcohol, sec-butyl alcohol, phenol, naphthol, an amyl alcohol, hexyl alcohol, iso-hexyl alcohol, octyl alcohol, decyl alcohol, dodecyl alcohol, octadecyl alcohol, 2-ethylhexyl alcohol, 4-methyl-2-pentyl alcohol, phenyl alcohol, butylphenyl alcohol, cyclohexyl alcohol, methylcyclopentyl alcohol, propenyl alcohol, butenyl alcohol, or combinations thereof.

10. The lubricating composition of claim 1, wherein the organic hydroxy compound is isobutyl alcohol, the reaction product comprises diisobutyl dithiophosphoric acid and one or more phosphorus polysulfides, the condensate includes the diisobutyl dithiophosphoric acid and is substantially free of the one or more phosphorus polysulfides, and the condensate is further reacted with methacrylic acid to form the oil-soluble phosphorus antiwear additive.

11. The lubricating composition of claim 1, wherein the lubricating composition includes about 0.1 to about 5 weight percent of the oil-soluble phosphorus antiwear additive.

12. The lubricating composition of claim 1, wherein the organic hydroxy compound is provided in a molar ratio relative to the phosphorus pentasulfide of about 4:1 to about 10:1.

13. The lubricating composition of claim 12, wherein the unsaturated carboxylic acid is provided in a molar ratio relative to the organic hydroxy compound of about 0.01:1 to about 0.5:1.

14. A method of preparing an oil-soluble phosphorus antiwear additive, the method comprising:
reacting an organic hydroxy compound with phosphorus pentasulfide to form a reaction product;
distilling the reaction product and recovering a condensate therefrom; and
reacting the condensate with an unsaturated carboxylic acid to form the oil-soluble phosphorus antiwear additive.

15. The method of claim 14, wherein the distillation occurs at a temperature of at least about 50° C.

16. The method of claim 15, wherein the distillation occurs at a pressure of at least about 0.1 torr.

17. The method of claim 14, wherein the condensate is recovered at a temperature of about 10° C. or less.

18. The method of claim 14, wherein the distillation occurs in a falling-film evaporator, a wiped-film evaporator, a thin-film evaporator, a short-path evaporator, or combinations thereof.

19. The method of claim 14, wherein the condensate includes a dialkyl dithiophosphorus acid.

20. The method of claim 19, wherein the dialkyl dithiophosphoric acid is dipropyl dithiophosphoric acid, diisopropyl dithiophosphoric acid, dibutyl dithiophosphoric acid, diisobutyl dithiophosphoric acid, or combinations thereof.

21. The method of claim 19, wherein the unsaturated carboxylic acid is an C1 to C20 fatty acid.

22. The method of claim 21, wherein the fatty acid is acrylic acid, methacrylic acid, 2-ethyl acrylic acid, or combinations thereof.

23. The method of claim 14, wherein the organic hydroxy compound is a C1 to C6 linear or branched alcohol, a hydroxy aryl compound, or mixtures thereof.

24. The method of claim 23, wherein the organic hydroxy compound is methyl alcohol, ethyl alcohol, propyl alcohol, isopropyl alcohol, butyl alcohol, isobutyl alcohol, tert-butyl alcohol, sec-butyl alcohol, phenol, naphthol, an amyl alcohol, hexyl alcohol, iso-hexyl alcohol, octyl alcohol, decyl alcohol, dodecyl alcohol, octadecyl alcohol, 2-ethylhexyl alcohol, 4-methyl-2-pentyl alcohol, phenyl alcohol, butylphenyl alcohol, cyclohexyl alcohol, methylcyclopentyl alcohol, propenyl alcohol, butenyl alcohol, or combinations thereof.

25. The method of claim 14, wherein the organic hydroxy compound is isobutyl alcohol, the reaction product comprises diisobutyl dithiophosphoric acid and one or more phosphorus polysulfides, the condensate includes the diisobutyl dithiophosphoric acid and is substantially free of the one or more phosphorus polysulfides, and the condensate is further reacted with methacrylic acid to form the oil-soluble phosphorus antiwear additive.

26. The method of claim 14, wherein the organic hydroxy compound is provided in a molar ratio relative to the phosphorus pentasulfide of about 4:1 to about 10:1.

27. The method of claim 26, wherein the unsaturated carboxylic acid is provided in a molar ratio relative to the organic hydroxy compound of about 0.01:1 to about 0.5:1.

28. An oil-soluble phosphorus antiwear additive made by a process comprising the steps of (a) reacting an organic hydroxy compound with phosphorus pentasulfide to form a reaction product; (b) distilling the reaction product and recovering a condensate therefrom; and (c) reacting the condensate with an unsaturated carboxylic acid to form the oil-soluble phosphorus antiwear additive.

* * * * *